VOLTAGE REGULATOR

Filed March 16, 1962 2 Sheets-Sheet 1

INVENTOR.
DAVID F. HILBIBER
BY
Lippincott, Ralls & Hendricson
ATTORNEYS

INVENTOR.
DAVID F. HILBIBER

BY

Lippincott, Ralls & Hendricson
ATTORNEYS

United States Patent Office 3,244,949
Patented Apr. 5, 1966

3,244,949
VOLTAGE REGULATOR

David F. Hilbiber, Los Altos, Calif., assignor to Fairchild Camera and Instrument Corporation, Syosset, N.Y., a corporation of Delaware Filed Mar. 16, 1962, Ser. No. 180,269
8 Claims. (Cl. 317—235)

The present invention relates to a unitary semiconductor voltage regulator device having temperature compensation and low dynamic impedance.

It is well known in the art to provide compensated voltage regulation with an avalanche diode and at least one forward biased rectifying junction, however, such a circuit has a relatively high dynamic impedance. Attempts to fabricate both the diode and forward biased junction in a single piece of semiconducting material commonly results in a transistor action by injection from the forward biased junction into the high energy field of the reverse biased junction so as to produce a negative resistance region in the voltage ampere characteristics. This is well recognized to be highly undesirable.

The present invention relates to a unitary device having temperature compensation and low dynamic impedance which is under all circumstances of a positive nature. Temperature compensation is obtained by the balancing of a positive temperature coefficient in the diode against a negative temperature coefficient of the emitter-base junction of a transistor. Furthermore, the present invention provides for a unitary device wherein the diode and the transistor are formed as a single physical unit and wherein the effect of terminal impedance is reduced. Not only is it possible to form the present invention as a single physical unit, but furthermore, it is possible to produce the device hereof with the same number of steps as are required in the production of a single transistor. This is particularly true in connection with diffused transistors, wherein selected impurities or dopants are successively diffused into one planar surface of a semiconducting wafer to form the requisite rectifying junctions therein.

The invention hereof is illustrated as to particular preferred embodiments in the accompanying drawing, wherein.

The present invention, in brief, comprises a unitary device preferably formed by diffusion techniques, wherein a diffused base zone has an emitter zone diffused therein and a further or additional zone similar to the emitter zone diffused across a junction of the base zone to thereby extend into the collector of the device. Both the emitter and further zone, noted above, have a greater concentration of impurities than does the collector, which has the same type of conductivity. Furthermore, the additional or further zone herein has a lower breakdown voltage to the base zone of the device than does the collector zone. This device then comprises a transistor having a breakdown diode electrically connected in parallel across the collector-base junction of the transistor. Inasmuch as current through the diode is equal to the input current divided by the amplification factor of the transistor plus one, it will be appreciated that variations of input current result in a much smaller voltage variation across the diode than would result for a same current change across a diode alone, and consequently, there is effected a material reduction in terminal impedance of the device. Voltage temperature compensation is achieved herein by the balancing of the positive temperature coefficient of the diode against the negative temperature coefficient of the emitter-base junction of the transistor formed in the device.

Figure 1:
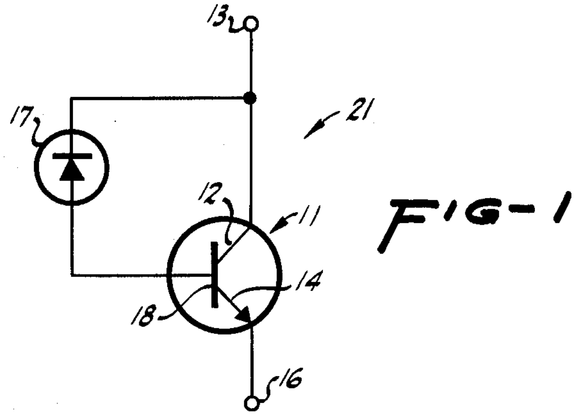
FIGURE 1 is a circuit diagram of the present invention.
Figure 2:
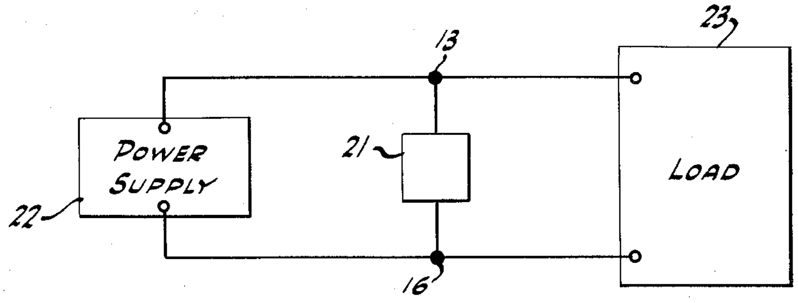
FIGURE 2 is a circuit diagram of the present invention connected to provide voltage regulation between the power supply and load circuit.

Considering now the invention in somewhat greater detail and referring to FIGURE 1, there will be seen to be illustrated a transistor 11 having a collector 12 thereof connected to a positive terminal 13 and an emitter 14 thereof connected to a negative terminal 16. A breakdown diode 17 is connected between the base 18 of the transistor and the positive terminal 13 in such an orientation as to most readily conduct from the base to the terminal 13. As above noted, this simplified circuit is connected so as to have a positive voltage applied to the terminal 13 and a negative voltage to the terminal 16. A simple application of the circuit 21 illustrated in FIGURE 1 is shown in FIGURE 2, wherein the circuit 21 is shown to be connected across a power supply 22 with some type of load circuit 23 connected in parallel with the circuit 21. The voltage variations from the power supply 22 will cause a varying current flow through the circuit 21 so that there is then impressed upon the load 23 a constant voltage.

The actual invention hereof is illustrated as to particular preferred embodiments in the remaining figures of the drawings, however, it is first to be noted from a consideration of the equivalent circuit of FIGURE 1 that the current through the breakdown diode 17 is equal to the input current of terminal 13 divided by the transistor D.C. current gain plus one. Thus, it will be seen that variations of the input current result in a much smaller voltage variation across the breakdown diode than would result from the same current change across a diode alone. This then means that the effective terminal impedance of the circuit is decreased. Current flow through the circuit hereof occurs both through the diode and the base-emitter portion of the transistor as well as through the total transistor itself, and consequently, temperature compensation is attained by a balancing of the negative temperature coefficient of the emitter-base junction of the transistor against the temperature coefficient of the breakdown diode 17.

Figure 3:
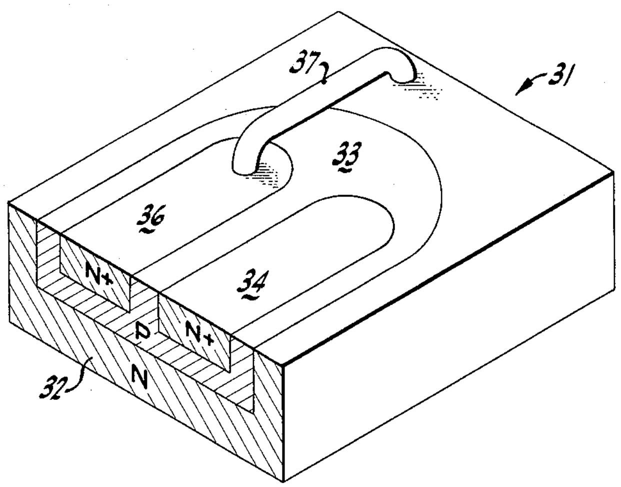
FIGURE 3 is a perspective view of one embodiment of the present invention.

Considering now FIGURE 3, there will be seen to be illustrated in perspective therein a wafer 31 of semiconducting material such as silicon, for example. This wafer comprises in major part the collector of the transistor formed within the wafer and may have an N-type conductivity, as produced by the limited diffusion of a donor impurity therethrough. The major portion of the wafer forming the collector 32 of the transistor has a very low resistivity, and in order to minimize extrinsic resistance the collector portion may be formed as an apitaxial growth. Within the wafer there is formed by diffusion a base zone 33 extending into the wafer from the upper surface thereof and having a P-type conductivity. Within this base zone 33 there are separately formed two N-type zones 34 and 36 as may be accomplished by the controlled diffusion of donor impurities in sufficient concentration into the wafer to overcome the acceptor properties of the base zone. Each of these zones 34 and 36 are relatively heavily doped and consequently are indicated in FIGURE 3 by the symbols $N^+$. A direct electrical connection is formed between the N-type material and the wafer and one of the $N^+$ zones 36, as for example, by the conductor 37 extending into ohmic contact with both the zone 36 and the collector region 32. This illustration of the physical embodiment of the invention is only exemplary and in actuality this electrical connection may be formed in a variety of ways, set forth in greater detail below. It is to be understood at this point that the electrical connection 37 does not short out the P–N junctions between the separate zones of the device.

Figure 4:
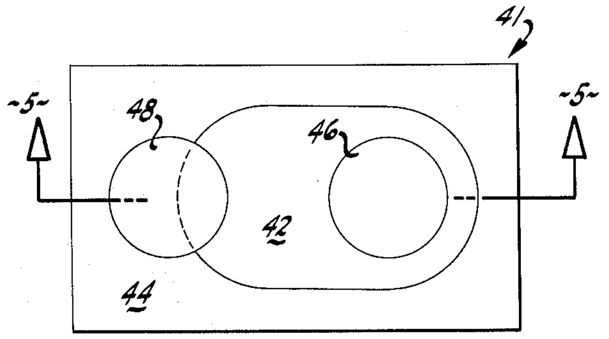
FIGURE 4 is a plan view of a unitary device embodying the present invention and having the protective coating upon same removed for a clearer indication of the location of rectifying junctions therein.
Figure 5:
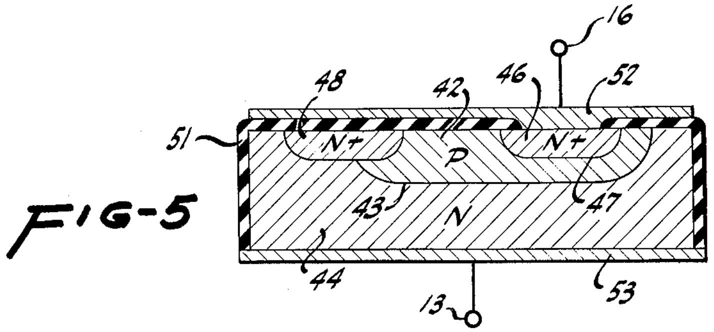
FIGURE 5 is a sectional view taken in the plane 5—5 of FIGURE 4.

An alternative embodiment of the present invention which may be quite readily formed without additional steps beyond those normally employed in the production of a single transistor is illustrated in FIGURES 4 and 5 of the drawings. It will be seen from reference to these figures that a wafer 41 of semiconducting material has a P-type zone 42 extending therein from the upper surface of the wafer and bounded by a P–N junction 43 separating this P-type zone from the N-type material of the remainder of the wafer. This N-type material of the wafer itself comprises not only a collector of a transistor formed within the device, but also one side of a diode therein, and is indicated in FIGURE 5 by the numeral 44. Within the P-type zone there is disposed an emitter zone 46 formed, for example, by the diffusion of a predetermined donor impurity into the upper surface of the wafer and is separated from the base by a P–N junction 47. This emitter is diffused or formed in off-set relation to the base zone in the wafer so as to be closer to one end thereof than to the other. At the opposite end of this P-type zone there is formed another N-type zone 48 as by the diffusion of a predetermined donor impurity into the planar upper surface of the wafer. Both of the zones 46 and 48 have a very substantial concentration of impurities therein, so that they may properly be identified by the symbol $N^+$, inasmuch as they exhibit strongly N-type characteristics. It will be seen that the further or additional zone 48 extends into the base zone as well as into the collector zone so that there is formed a P–N junction 49 between this further zone 48 and the base zone 42. There is not, however, formed a rectifying junction between the zone 48 and the collector portion of 44 of the wafer.

The device of the present invention may be completed by the formation of a protective insulating coating 51 over substantially all of the top of the wafer and possibly extending down the sides thereof, as indicated. This protective insulative coating 51 may, for example, be formed of a material such as silicon oxide when the device hereof is made as a silicon element, and in accordance with known practices may actually be formed upon the silicon during the process of manufacturing the device. Electrical connections are provided by the formation of an opening in the coating 51 and the attachment of ohmic connection 52 to the emitter zone 46 atop the wafer. This connection 52 may be plated over the top of the wafer and is connected to a terminal as indicated as 16, in correspondence to the numbers employed in the exemplary circuit of FIGURE 1. The back or lower side of the wafer may have an extensive ohmic contact 53 formed thereon and connected to a positive terminal as indicated as 13, in correspondence to the numerals employed in the explanatory circuit of FIGURE 1. It will be seen that the device is actually a two terminal device which may thus be readily mounted in a diode package. The normal diode contacts may be employed to electrically engage the upper and lower contacts 52 and 53 of the device, and consequently, to form the requisite electrical connections thereto.

Manufacture of the device as described above may be quite readily accomplished in accordance with conventional or well known diffusion techniques employed in the transistor art. Thus, a low resistance wafer may be appropriately masked and an acceptor impurity diffused into the upper surface thereof to form the base zone 42. Either concurrently with this diffusion or subsequent thereto, there is formed an impervious masking or oxide layer over the upper surface of the base zone, which is then apertured in appropriate areas for the subsequent diffusion of a donor impurity to form the two highly doped $N^+$ zones 46 and 48 comprising the emitter and additional zone of the device. In the event that an extended electrical contact is desired atop the device, care is taken that the area above the zone 48 is well covered by an insulating layer, as indicated, and an opening is formed through the layer to the emitter zone 46, following which the electrically conducting metal is plated or otherwise disposed atop the wafer into connection with the wafer at the zone 46. It will be seen that in this manner there are included no more steps than in the manufacture of conventional transistors, for the additional zone 48 is formed by diffusion at the same time as the emitter zone is formed.

As briefly noted above, the concentration of impurities in the zones 48 and 46 is much greater than in the zone 44. Injection of a current into the zone 44 from the terminal 13 will cause the P–N junction 49 to break down, thereby injecting majority carriers into the base region of the transistor, and consequently, producing a transistor action between the zones 44, 42, and 46 of the transistor defined within the device. It is particularly noted at this point that the breakdown voltage of the diode junction 49 must be less than the breakdown voltage of the collector junction 43. In order for the composite device of the present invention to properly operate, it is necessary for initial breakdown to occur across the junction 49. This is accomplished herein by controlling the impurity concentration in the P-type zone 42. Inasmuch as the subsequently formed emitter and additional zones 46 and 48, respectively, are herein defined as having a greater impurity concentration than the collector zone 44, it will be appreciated that the concentration of impurities in the P-type zone 42 then determines the gradient across the adjacent junctions. There may thus be readily attained a precise control of the breakdown voltage of the diode junction 49 so as to insure that this breakdown voltage is less than the breakdown voltage of the collector junction 43.

With regard to the establishment of temperature compensation in the device of the present invention, it is noted that current conduction occurs from the $N^+$ region 48 to the P-type region 42 across the diode junction and in an opposite sense from the P-type region 42 to the $N^+$ region 46 across the emitter junction. Consequently, these junctions will exhibit opposite temperature coefficients in the circuit hereof. With the polarity of regions as illustrated in FIGURE 5, i.e. wherein an N-P-N transistor is formed, the diode junction 49 will exhibit a positive temperature coefficient that is to say an increase in breakdown voltage with increase in temperature while the base-emitter junction of the transistor will exhibit a negative temperature coefficient. With the temperature coefficients being of opposite sign it then remains to provide a balance therebetween in order to produce a substantially net zero voltage variation over a predetermined temperature range. This is accomplished herein by controlling the concentration of impurities in the diode zone 48, for it is known that the temperature coefficient of P-N junctions is dependent upon the variety of factors including the doping levels or concentration of impurities on opposite sides of the junction. Thus, by controlling the concentration of impurities in the $N^+$ zone 48, it is possible to attain a desired temperature coefficient of the diode junction. As regards the emitter junction, it is noted that another factor greatly influencing temperature coefficient is the level of current flow through the junction. This latter factor effects the temperature coefficient to a much greater extent than the doping levels and in the device hereof a much greater current flows through the emitter junction than flows through the diode junction. Consequently, temperature compensation, or equal and opposite temperature coefficients of the diode and emitter junctions, is obtained herein by controlling the concentration of impurities diffused into the wafer in the formation of the emitter and diode zones 46 and 48, so that equal and opposite temperature coefficients for these junctions will occur at a predetermined current level through the emitter junction. Application of a greater concentration of impurities, i.e. heavier doping, results in a smaller temperature coefficient and thus a controlled diffusion schedule provides for ready matching of the two coefficients as herein required.

With the matching of temperature coefficients and the passage of current in opposite directions through the two P-N junctions of interest, i.e. the junctions 47 and 49, there is then attained a precise temperature compensation of the circuit. Furthermore, by the maintenance of the breakdown voltage of junction 49 less than the breakdown voltage of the collector junction 43, it is insured that the circuit will operate as desired, i.e. that conduction or transistor action through the transistor portion of the device shall be initiated and, in fact, controlled by the injection of majority carriers into the base region of the transistor from the diode portion of the device.

It will furthermore be noted that the device illustrated in FIGURES 4 and 5 is electrically equivalent to the device illustrated in FIGURE 3, inasmuch as FIGURE 3 provides for a direct electrical connection of the $N^+$ zone 36 to the collector zone 32 via conductor 37. Certain advantages are attained by the provision of this electrical conductor extending to a far corner of the wafer, as indicated. It is also to be noted that the device of the present invention exhibits a very small thermal time constant and also provides a very low spreading resistance, which latter factor is of great advantage when switching operations are contemplated. It is furthermore to be noted that electrical connection may be made to the zone 48 in place of the illustrated connection to the zone 44, inasmuch as these two portions of the device are electrically identical.

Figure 6:
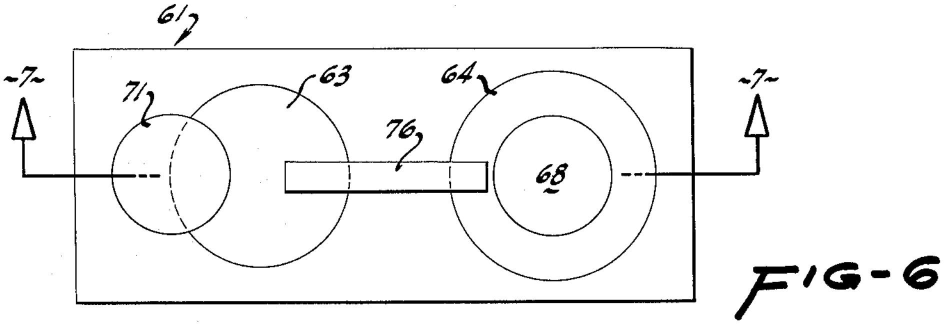
FIGURE 6 is a plan view of an alternative embodiment of the present invention and likewise having the protective covering coating removed for a clearer indication of the location of rectifying junctions in the device.
Figure 7:
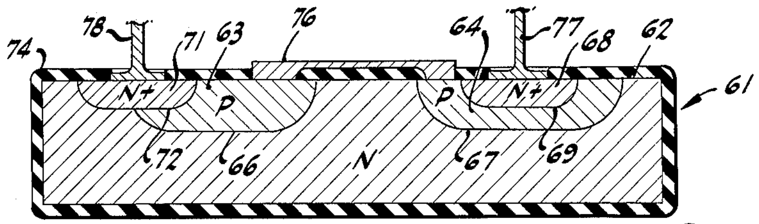
FIGURE 7 is a sectional view taken in the plane 7—7 of FIGURE 6.

There is illustrated in FIGURES 6 and 7 an alternative physical embodiment of the present invention, and it is noted that the illustration of FIGURE 6 does not include the protective insulation over the surface thereof in order that the physical configuration of the zones therein may be better illustrated. As illustrated in these figures, there is provided a wafer 61 having a planar upper surface 62, and the wafer itself may initially be formed of a low resistance N-type silicon. Into this upper surface 62 there is diffused a pair of P-type regions 63 and 64 thus defining P-N junctions 66 and 67, respectively, separating such regions from the N-type portion of the wafer and with these junctions extending to the planar surface 62. In laterally off-set relation to the P-type region 64, there is diffused an $N^+$ region 68 by the dispersion of a high concentration of donor impurities into the wafer to thereby overcome the acceptor properties of this portion of the wafer. This region 68, which constitutes an emitter zone of a transistor formed in the wafer, is separated from the P-type base zone 64 by a P-N junction 69. There is also provided an additional N-type zone 71 extending from the upper surface of the wafer in part into the P-type zone 63 and in part into the N-type region of the wafer itself. This zone 71 may be formed by the diffusion of a substantial concentration of donor impurities into the wafer to thereby form an $N^+$ conductivity for the zone, and consequently, to define a P-N junction 72 separating this zone 71 from the P-type zone 63. Upon the outer surface of the wafer there is formed a protective insulating layer such as silicon oxide 74 which is preferably employed in the processing of the device to limit the lateral extent of impurity diffusions and also to provide a continuous protection for the P-N junctions extending to the planar surface 62 of the wafer. This insulating layer or coating 74 is retained upon the wafer during and following manufacturing operations and is, in fact, retained thereon throughout the life of the device. Through the protective insulative coating 64 there are formed openings to the P-type zones 63 and 64 and an electrical conductor 76 is plated over a limited portion of this coating through the openings in the wafer to thereby electrically connect the two P-type zones 63 and 64 therein. An ohmic contact 77 extends through an opening in the coating into contact with the emitter zone 68 and a further ohmic contact 78 contacts the zone 71 through another opening in the coating.

The device illustrated in FIGURES 6 and 7 will be seen to be the electrical equivalent of the devices illustrated in FIGURE 3 and FIGURES 4 and 5. The electrical connection 76 between the P-type zones 63 and 64 then serves to produce the same result as is accomplished in the above-described embodiment wherein but a single P-type zone is diffused in the wafer. The device of this configuration requires no more steps insofar as the establishment of semiconductor zones than does the embodiment illustrated in FIGURES 4 and 5, for it is possible to simultaneously diffuse both of the P-type zones 63 and 64 and also to simultaneously diffuse the $N^+$ zones 71 and 68. It is required, as an additional step, that the lead 76 be applied over the oxide coating between the two P-type zones.

This latter embodiment provides both electrical connections of the device extending from a single planar surface of the element. This alternative is also available in the embodiment illustrated in FIGURES 4 and 5, for in such case it is only necessary to form an ohmic contact through an opening in the coating 51 into engagement with the zone 48. As above noted, the provision of an electrical contact from either the collector zone or from the additional zone forming a part of the diode are electrically equivalent. For certain applications advantage lies in the configuration of FIGURES 4 and 5, inasmuch as same is readily packaged in a diode container, however, a transistor package may be most readily employed for encapsulating the embodiment of FIGURES 6 and 7. In common with the above-described embodiments of the present invention, the physical configuration of the invention illustrated in FIGURES 6 and 7 also require that the breakdown voltage across the diode junction be less than the collector base breakdown voltage. In this instance the junctions in question are the diode junction 72 and the collector-base transistor junction 67. This relationship is also attained herein by control of the impurity levels in the zones defining these junctions. It is also required herein that the temperature coefficient of the emitter junction 69 be balanced with the temperature coefficient of the diode junction 72 in order that temperature compensation shall be attained. This requirement is likewise accomplished through the provision of control over the doping level of the diode zone 71, for the doping level of the diode formed by the zones 71 and 63 determines this temperature coefficient.

There has been described above certain preferred embodiments of the unitary semiconductor device of the present invention which constitutes a temperature compensated voltage regulator having low dynamic impedance. In distinction to conventional transistorized voltage regulators, wherein the dynamic impedance commonly varies between 15 and 75 ohms, the present invention has been found under observation to have a dynamic impedance ranging from 4 to 7 ohms at an input current of about 10 milliamperes. Exemplary devices have shown temperature compensation at an input current of about one to two milliamperes with a temperature coefficient less than .003 percent per degree centigrade over a temperature range from 0 to100 degrees centigrade. Temperature compensation at much higher currents is also possible.

There will thus be seen to be provided hereby an improved unitary voltage regulator readily formed as a single unit by known manufacturing techniques and without requiring any more steps than are employed in the manufacture of transistors, for example. The device hereof may, in fact, be manufactured with the same number of steps as are employed in the manufacture of a conventional double-diffused planar transistor. It will, of course, be appreciated that the unit of the present invention may either be formed as an N-P-N unit, as described above, or as a P-N-P unit, with an appropriate reversal of polarities. While the present invention has been illustrated and described in connection with a number of preferred embodiments thereof, it is not intended to limit the invention to the illustrated or described details, but instead reference is made to the appended claims for a precise delineation of the true scope of this invention.

What is claimed is:

1. A semiconductor circuit formed in a single monocrystalline wafer of semiconducting material and comprising a collector zone of a predetermined impurity concentration, a base zone of a greater impurity concentration than said predetermined concentration and of opposite conductivity type to said collector zone, an emitter zone of higher impuritiy concentration than said base zone and of opposite conductivity type to said base zone, a further zone of higher impurity concentration than said base zone and of the same conductivity type as said emitter, and separate ohmic contacts to said emitter and said collector zones, said further zone extending into both base and collector zones.

2. A semiconductor circuit device suitable as a voltage regulator comprising a semiconducting wafer of a first conductivity type, at least one unitary zone of an opposite conductivity type extending into said wafer to define a first P-N junction therein, a pair of zones of said first conductivity type in said wafer, one of said pair being electrically joined to the wafer of first conductivity type and forming a second P-N junction with a zone of said opposite conductivity type, the other zone of said pair contacting only a zone of said opposite conductivity type, and separate ohmic contacts to said other zone and to said wafer of first conductivity type, said second P-N junction having a lower breakdown voltage than said first P-N junction whereby electrical connections to the wafer of first conductivity type and to the other of said pair of zones from a power supply provides a substantially constant voltage at such connections.

3. A device as set forth in claim 2 further defined by there being two zones of said opposite conductivity type spaced apart in said wafer, and electrical connection between said two zones of opposite conductivity type.

4. A device as set forth in claim 2 further defined by there being a single elongated zone of said opposite conductivity type, said pair of zones of first conductivity type extending only into said zone of opposite conductivity type, and electrical connection from the first of said pair of zones to said wafer of first conductivity type.

5. A semiconductor device comprising a wafer of low resistance semiconducting material of N-type conductivity with a planar surface, at least one P-type zone extending into said wafer from said surface, a pair of N-type zones extending into said P-type material of the wafer from said surface with at least a first of said pair forming a P-N junction entirely within the P-type material, electrical connection between a second zone of said pair and the N-type material of said wafer, a separate ohmic contact to the first of said pair of N-type zones, and another separate ohmic contact to the N-type material of said wafer, the P-N junction between the second of said pair of zones and said P-type material having a lower breakdown voltage than the P-N junction between the P-type material and the low resistance N-type material of said wafer whereby application of a positive voltage to said second ohmic contact relative to the first causes an injection of carriers from the second of said pair of zones into said P-type material to produce a transistor action between the N-type wafer, P-type material, and first N-type zone for voltage regulation.

6. A semiconductor device as set forth in claim 5 further defined by a single elongated P-type zone extending into the wafer from said planar surface, the first of said N-type zones being disposed adjacent one end of said P-type zone, and the other of said N-type zones extending into the opposite end of said P-type zone and into the N-type material of the wafer for electrical connection to the latter.

7. An improved voltage regulator comprising a single wafer of semiconducting material, an N-type zone in said wafer, at least one P-type zone in the wafer defining a first P-N junction, a pair of $N^+$ type zones in said wafer with a first thereof only engaging a P-type zone, a second of said $N^+$ type zones forming a second P-N junction with a P-type zone and being electrically connected to said N-type zone whereby the breakdown voltage of said second P-N junction is less than that of said first P-N junction, separate ohmic contacts to said first $N^+$ type zone and to said wafer, said first N-type zone forming a third P-N junction which at a predetermined level of current conduction has substantially the same absolute value of temperature coefficient of voltage as said first P-N junction to thereby provide stabilized voltage regulation for a voltage applied between said N-type zone and the first of said $N^+$ type zones.

8. A voltage regulator device comprising a single wafer of monocrystalline semiconducting material, a first zone of a first conductivity type therein, a second zone of opposite conductivity type in said wafer and defining a first P-N junction between said zones, a third zone of the same conductivity type as said first zone and defining a transistor with said first and second zones, a fourth zone of the same conductivity type as said first zone in electrical contact with said first zone and defining a second P-N junction with said second zone, the breakdown voltage of said second P-N junction being less than that of said first P-N junction, separate ohmic contacts to said third zone and first zone for the application of a voltage therebetween to produce initial conduction across said second P-N junction with rising voltage followed by transistor action through the transistor defined by said first, second, and third zones, the temperature coefficient of said second P-N junction being substantially equal and opposite to the coefficient of a P-N junction between said second and third zones for temperature compensated regulation of a voltage applied between said ohmic contacts.

References Cited by the Examiner

UNITED STATES PATENTS

| | | | |
|---|---|---|---|
| 2,655,610 | 10/1953 | Ebers | 317—235 |
| 2,666,814 | 1/1954 | Shockley | 317—235 |
| 2,767,358 | 10/1956 | Early | 317—235 |
| 2,846,592 | 8/1958 | Rutz | 317—234 |
| 2,847,583 | 8/1958 | Lin | 317—235 |
| 2,953,759 | 9/1960 | Lehovec | 317—239 |
| 2,993,154 | 7/1961 | Goldey | 317—235 |
| 3,079,512 | 2/1963 | Rutz | 317—235 |
| 3,176,147 | 3/1965 | Miller | 317—235 |

JOHN W. HUCKERT, *Primary Examiner.*

J. D. KALLAM, *Assistant Examiner.*